United States Patent
Schwenold

(10) Patent No.: US 10,167,926 B2
(45) Date of Patent: Jan. 1, 2019

(54) SELF-ADHESIVE BALANCING WEIGHT FOR A VEHICLE WHEEL

(71) Applicant: WEGMANN automotive GmbH & Co. KG, Veitshöchheim (DE)

(72) Inventor: Hubert Schwenold, Winterlingen-Harthausen (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 0 days.

(21) Appl. No.: 15/840,425

(22) Filed: Dec. 13, 2017

(65) Prior Publication Data

US 2018/0100557 A1  Apr. 12, 2018

Related U.S. Application Data

(63) Continuation of application No. PCT/EP2017/051940, filed on Jan. 30, 2017.

(30) Foreign Application Priority Data

Feb. 2, 2016  (EP) ..................................... 16153928

(51) Int. Cl.
 *F16F 15/32* (2006.01)

(52) U.S. Cl.
 CPC ................................. *F16F 15/328* (2013.01)

(58) Field of Classification Search
 CPC ......... F16F 15/32; F16F 15/324; F16F 15/328
 See application file for complete search history.

(56) References Cited

U.S. PATENT DOCUMENTS

| 3,960,409 A * | 6/1976 | Songer ................. F16F 15/328 301/5.21 |
| 5,959,205 A * | 9/1999 | Yamaya ................. F16F 15/34 301/5.21 |
| 6,874,856 B2 * | 4/2005 | Yoshimura ............ F16F 15/328 301/5.21 |
| 2006/0158018 A1 * | 7/2006 | Francischetti ........ F16F 15/324 301/5.21 |
| 2007/0108834 A1 | 5/2007 | Fogal et al. |

(Continued)

FOREIGN PATENT DOCUMENTS

| CN | 201235706 Y | 5/2009 |
| CN | 101555925 A | 10/2009 |

(Continued)

*Primary Examiner* — Jason R Bellinger
(74) *Attorney, Agent, or Firm* — Quarles & Brady LLP; Yakov S. Sidorin

(57) ABSTRACT

A balancing weight, for balancing a wheel of a vehicle, which includes a bottom surface to be attached to the rim of the wheel, opposed thereto a top surface, two long sides opposing each other, between the top surface and the bottom surface and two short sides opposing each other, between the long sides and between the top surface and the bottom surface. The balancing weight is an arch segment having a convex bottom surface extending between the short sides, and the short sides disposed at an angle of less than 90° with respect to the bottom surface, and at an angle of more than 90° with respect to the top surface. Furthermore, the short sides are convex-shaped from one long side to the other long side.

10 Claims, 5 Drawing Sheets

(56) References Cited

U.S. PATENT DOCUMENTS

| | | | | |
|---|---|---|---|---|
| 2011/0215635 A1* | 9/2011 | Yamaguchi | ............ | F16F 15/324 |
| | | | | 301/5.21 |
| 2013/0038116 A1* | 2/2013 | Fischer | ................ | F16F 15/324 |
| | | | | 301/5.21 |
| 2017/0159748 A1* | 6/2017 | Hornung | ................ | F16F 15/324 |

FOREIGN PATENT DOCUMENTS

| | | |
|---|---|---|
| CN | 202879147 U | 4/2013 |
| CN | 203511149 U | 4/2014 |
| DE | 102005009605 A1 | 9/2006 |
| DE | 102010008657 A1 | 8/2011 |
| FR | 1309582 A | 11/1962 |
| WO | 9900609 A1 | 1/1999 |

* cited by examiner

SELF-ADHESIVE BALANCING WEIGHT FOR A VEHICLE WHEEL

CROSS-REFERENCE TO RELATED APPLICATIONS

This application is a continuation of a pending International Application No. PCT/EP2017/051940 filed on Jan. 30, 2017, which designates the United States and claims priority from the European Application No. 16153928.3 filed on Feb. 2, 2016. The disclosure of each of the above-identified applications is incorporated herein by reference.

BACKGROUND

1. Field of the Invention

The invention relates to a self-adhesive balancing weight, which may be attached to the rim of a wheel of a vehicle and, specifically, to a wheel of a truck for balancing the wheel.

2. Description of Relevant Art

Self-adhesive balancing weights are affixed by an adhesive tape to the surface of a rim of wheel. The contact surface of a self-adhesive balancing weight generally is formed so as to accurately fit to the counter surface of the wheel rim holding the weight to provide as much contact surface and thereby adhesive surface area as possible in order to ensure safe fixation. The adhesive tape may have a foam layer to compensate for mechanical tolerances.

WO 99/00609 discloses self-adhesive balancing weights the contact surfaces of which are exactly complementary to the shape of the counter-surface of the respective wheel rim, so that they could not be used with wheel rims of a different shape.

US 2007/0108834 A1 discloses a balancing weight body filled with mass material particles.

FR 1.309.852 discloses a balancing weight with a curved attachment section.

DE 10 2010 008 657 A1 discloses balancing weights having a curved surface for axial mounting (i.e., mounting in a plane parallel to the axis) to a rim. They do not fit to a radial plane (i.e., a plane extending radially from the axis).

DE 10 2005 009 605 A1 discloses balancing weights having curved sides for mounting to a radial plane of a rim. These weights are not adapted for axial mounting.

There exists a large number of different rim geometries on the market. Furthermore, the rims generally possess significant mechanical tolerances, which may be on the order of 1 mm or more.

Self-adhesive balancing weights usually have a planar back surface, which is designed to adhere to an at least essentially planar surface that is curved only around the rotational axis of the wheel. Accordingly, the self-adhesive balancing weights have to be bent only along one axis. This bending may be performed sufficiently precisely by an assembly machine, which presses the balancing weights to the rim, or by manually pre-bending the weights before the application. While these methods provide good results when applying balancing weights to the rims of passenger cars, they are not applicable to trucks, as the larger truck weights are non-bendable cast elements. Strain on truck balancing weights is generally higher than that on passenger car balancing weights, because maintenance is performed on trucks with significantly longer maintenance intervals than those for maintenance on passenger cars and, therefore, the balancing weights used on a truck wheel have to be held reliably at the wheel for a much longer time. Furthermore, due to the larger dimensions of tires on trucks, the masses of truck balancing weights are often much higher than masses of balancing weights used with passenger cars, which further requires higher holding forces. In addition, the plane of the weight mounting surface often is at an angle of less than 90° with respect to the wheel rotation axis, such that the weights are neither mounted axially nor radially, but in an "in between" orientation.

SUMMARY OF THE INVENTION

The embodiments are directed at such self-adhesive balancing weights that provide a higher and longer-lasting adhesive force even if the weights are mounted at a surface which is inclined an angle of less than 90° with respect to the wheel rotation axis. Furthermore, the balancing weights should be applicable to a broad variety of rim geometries and sizes.

In an embodiment, a balancing weight for balancing a wheel of a vehicle (and preferably of a truck or a bus) has roughly the arcuate shape (shape of a segment of an arc). Such balancing weight has a bottom surface, which may be used to hold the balancing weight to a rim, preferably by means of an adhesive tape. Opposed to the bottom surface there is a top surface, which further may bear at least one visible marking, which may indicate the size and/or the mass and/or the manufacturer of the balancing weight. The balancing weight further has two opposing long sides (interchangeably referred to herein as first sides) between the top surface and the bottom surface and two opposing shorts sides (interchangeably referred to herein as second sides) between the top surface and the bottom surface. The first sides are longer than the second sides. The short sides form an angle of less than 90° with the bottom surface, and an angle of more than 90° with the top surface. The bottom surface has a convex shape extending between the short sides of the balancing weight. It is preferred, if the long sides and the top surface have a planar shape. It is further preferred, if the edges and corners of the balancing weight are rounded or chamfered.

It is further preferred, if the short sides are convex-shaped between one long side and the other long side. This means that the short sides are curved in a direction between the long sides and are straight in a direction from the top surface to the bottom surface.

In a further embodiment, the long sides are at an angle of less than 90° with respect to the bottom surface, and at an angle of more than 90° with respect to the top surface.

Such specific form of a balancing weight allows for mounting the balancing weight to surfaces of a rim that are oriented radially or axially or at any angle in-between these two orientations. As the balancing weights basically are arch segments (which is caused by the slanted short sides having an angle of less than 90° with respect to the bottom surface and an angle of more than 90° to the top surface, together with the convex bottom surface), these balancing weights can be chained or mounted close to each other at a curved surface that is oriented in an axial direction (that is, along a line parallel to the axis of rotation). Due to the convex short sides, the neighboring balancing weights may be tilted against each other and therefore may easily be mounted to surfaces that are oriented radially with respect to the rotation axis. As the preferred embodiments of the invention comprise both of the previously mentioned features, the balancing weights also lend themselves to be mounted to any surface oriented an angle between that corresponding to the orientation parallel to the rotation axis and that corresponding to the orientation that is radial with respect to the rotation axis of the wheel.

Basically, the bottom surface of a balancing weight embodiment may have two different shapes. In the first embodiment, the bottom surface is convex, thereby forming a curve extending between the two short sides, and is straight along a direction between the long sides. In a further preferred embodiment, the bottom surface has a double curvature, such that a further curve extends between the both long sides. This specific double-curved bottom surface results in a point having a maximum elevation, which is at the center of the balancing weight defined between the long sides and the short sides. If the balancing weight is attached to a rim, the rim surface being oriented either radially or axially, in most cases the center of the balancing weight's bottom surface preferably is closest to the rim surface, and therefore such center asserts the highest pressure to the adhesive tape. Having the point of highest pressure at the center of the balancing weight leads to superior adhesion of the balancing weight to the rim.

It is preferred, if the balancing weights disclosed herein comprise at least one of lead, zinc, tin, iron, stainless steel, plastic or a combination thereof.

A further embodiment relates to a method for applying a balancing weight, configured as previously disclosed, to the rim of the wheel by selecting an appropriate location at the rim of the wheel and pressing the balancing weight to the selected location of the rim of the wheel. It is preferred to remove a liner of an adhesive tape before attaching the balancing weight to the rim of the wheel.

BRIEF DESCRIPTION OF THE DRAWINGS

In the following, the invention will be described by way of examples of embodiment, without limitation of the general inventive concept, and with reference to the drawings.

Figure 1:
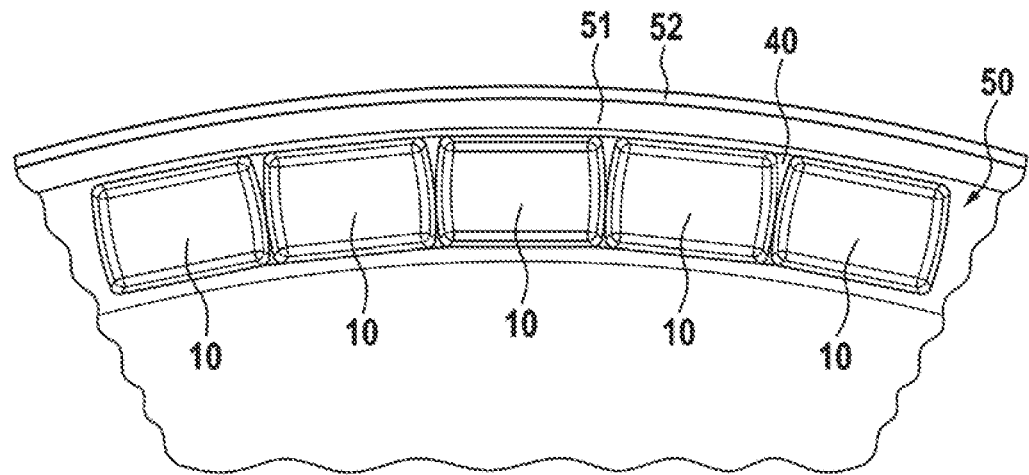
FIG. 1 shows a plurality of balancing weights attached to a rim.

While embodiments of the invention can be modified to assume alternative forms, specific embodiments are shown only as examples in the drawings, and will herein be described in detail. It should be understood, however, that the drawings and related detailed portions of description are not intended to limit embodiments to the particular form disclosed, but on the contrary, the scope of the intention is intended to cover all modifications, equivalents and alternatives falling within the spirit of the present invention as defined by the appended claims.

DETAILED DESCRIPTION

In FIG. 1, a plurality of balancing weights are shown, which are attached to a rim of a wheel. The rim 50 of the wheel has a rim flange 51 and an edge 52. Here, five balancing weights 10 are shown attached by means of an adhesive tape 40 to the rim 50.

Figure 2:
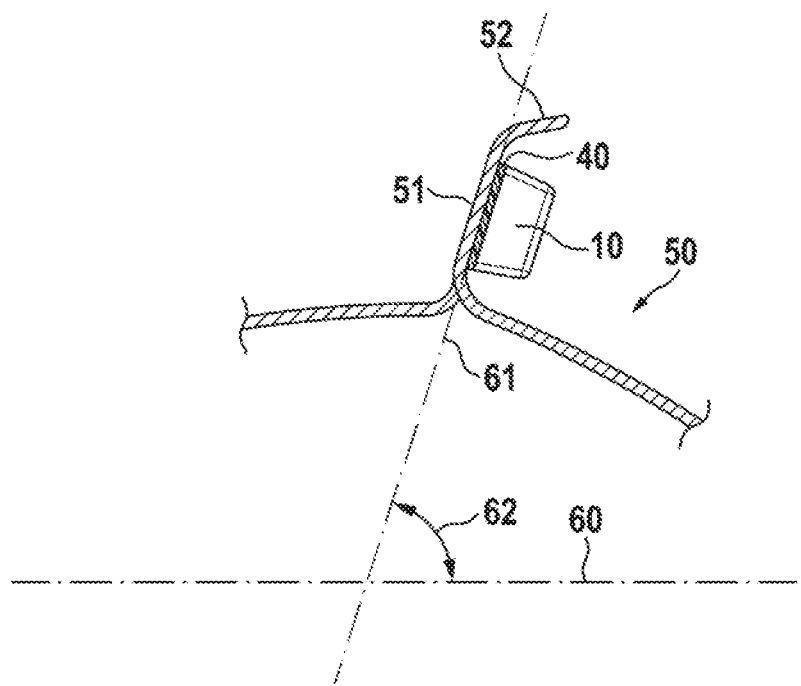
FIG. 2 shows a side view of balancing weights attached to a rim.

In FIG. 2, a side view of a section of a rim is shown with balancing weights attached thereto. A balancing weight 10 is held via adhesive tape 40 to the rim 50 of a wheel. The plane 61 of the weight mounting surface is inclined at an angle 62 of less than 90° with respect to the wheel rotation axis 60.

Figure 3:
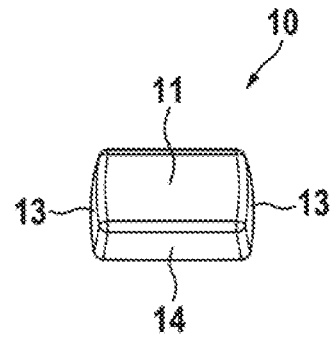
FIG. 3 shows a perspective view of a balancing weight.

In FIG. 3, a perspective view of a balancing weight 10 is shown. It has a top surface 11, two short sides 13 and a long side 14 at the front. The opposing long side 14 at the rear and the bottom surface 12 cannot be seen in this Figure.

Figure 4:
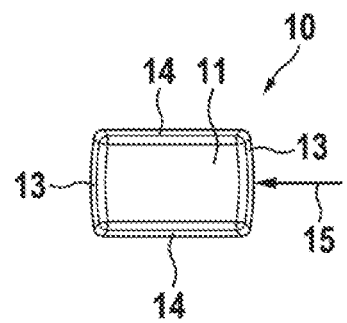
FIG. 4 shows a top view of a balancing weight.

In FIG. 4, a top view of a balancing weight 10 is shown. At the top is the top surface 11. At the left and the right, there are shown short sides 13, and between the short sides 13 there are the long sides 14. Preferably, the shape of the short sides 13 between the long sides 14 is convex, and characterized with a radius of curvature 15.

Figure 5:
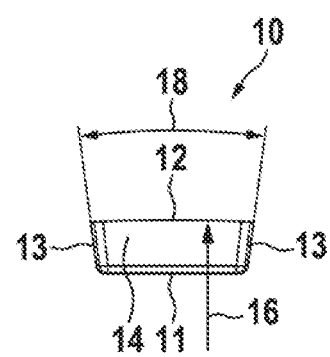
FIG. 5 shows a side view at a long side.

In FIG. 5, a side view on a long side 14 of the balancing weight 10 is shown. The bottom surface 12 preferably is convex, with an arcuate shape extending between the short sides 13 and a radius of curvature 16. A preferred value for such radius 16 is between 200 and 400 mm, preferably around 300 mm. The short sides 13 preferably are at an angle 18 with respect to one another, which angle is further preferred to be in a range of 5° to 25°, and more preferably between 13° and 17°.

Figure 6:
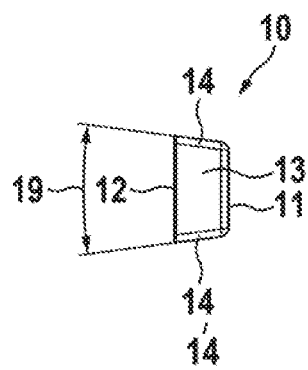
FIG. 6 shows a side view on a short side of a balancing weight.

In FIG. 6, a side view on a short side 13 of a balancing weight 10 is shown. In this view, the bottom surface 12 extends straight between the long sides 14, while the curvature of the bottom surface 12 extends between the short sides 13. It is preferred, if the long sides 14 form an angle 19 with respect to one another, which angle if further preferred to be in a range of 5° to 25°, and more preferably between 13° and 17°.

Figure 7:
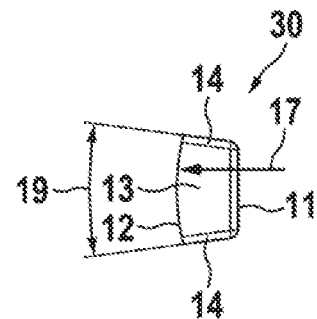
FIG. 7 shows another embodiment of the balancing weight.

In FIG. 7, another embodiment of the balancing weight 30 is shown. Here, the bottom surface is double-curved (curved in two planes) and has a second curve having a second radius of curvature 17 and extending between the long sides 14. A preferred value for such a radius 17 is between 200 and 400 mm, more preferably around 300 mm.

Figure 8:
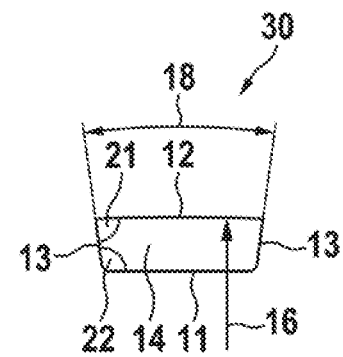
FIG. 8 shows details of the angles of the short side.

In FIG. 8, details of the angles formed by the short sides of a balancing weight 30 are shown. The short sides 13 are arranged at an angle 21 of less than 90° with respect to the bottom surface 12, and at an angle 22 of more than 90° with respect to the top surface 11. Basically the same orientation and/or configuration may apply to all embodiments of balancing weights mentioned herein.

Figure 9:
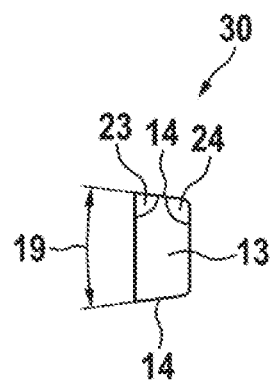
FIG. 9 shows details of the angles of the long side.

In FIG. 9, details of the angles formed by the long sides of the balancing weight 30 are shown. The long sides 14 are arranged at an angle 23 of less than 90° with respect to the bottom surface 12, and at an angle 24 of more than 90° with respect to the top surface 11. Basically the same orientation and/or configuration may apply to all embodiments of balancing weights mentioned herein.

Figure 10:
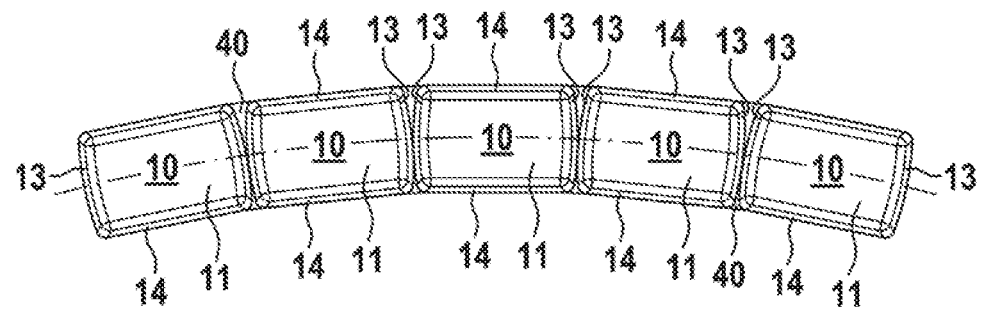
FIG. 10 shows a chain of balancing weights on a surface in radial direction.

In FIG. 10, a chain of balancing weights 10 is shown on a surface extending radially from the axis of rotation of the wheel, in a radial direction. Due to the convex-curved short sides 13, the balancing weights can easily be tilted against each other. This way of tilting reduces the tension stress to the adhesive tape in the gap between the balancing weights. If the balancing weights would not have the convex short sides, the extension of the adhesive tape in the gap would be significantly higher. This would lead to a decrease in thickness and elasticity of the balancing weight, which would further lead to a reduced adhesive force in the region where the gap between the balancing weights opens. Therefore, due to the convex-curved short sides, the distribution of adhesive force and the long-time stability of the adhesive force and be increased.

Figure 11:
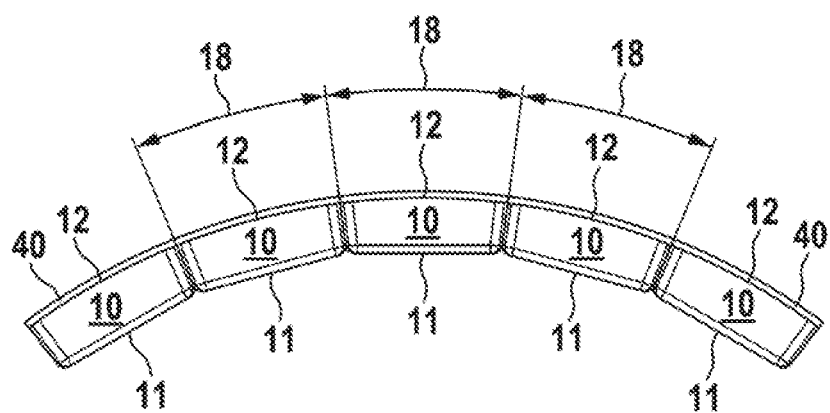
FIG. 11 shows balancing weights in an axial plane.

In FIG. 11, a chain of balancing weights 10 is mounted on an axially oriented (i.e., parallel to the axis) plane. Due to the angles 18 formed by the short sides of a single weight, the multiplicity of balancing weights can be mounted without forming a gap close to the adhesive tape and, therefore, allow to avoid stretching the adhesive tape. Therefore, the disadvantages of a stretched adhesive tape, typical for embodiments of related art, as mentioned above, can be avoided. In this Figure, the arch-segmented shape and the arrangement of the plurality of the arch-segmented shape balancing weights is clearly shown.

Figure 12:
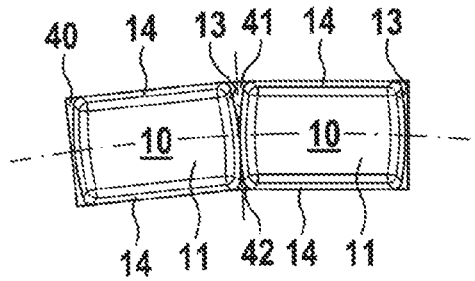
FIG. 12 shows two balancing weights mounted under an angle.

FIG. 12 shows two balancing weights configured according to any of the previous embodiments and mounted at an angle adapted to the radius of a rim as shown in FIG. 10. Here, the adhesive tape is slightly compressed in a region 42 oriented inwards with respect to the radius and slightly extended or stretched in a region 41 oriented outwards with respect to the radius.

Figure 13:
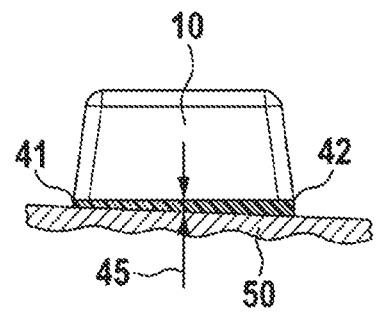
FIG. 13 shows a sectional view of the adhesive tape of FIG. 12.

FIG. 13 shows a sectional view through the adhesive tape between the balancing weights, which has a slightly smaller thickness in the stretched region 41 as compared to the normal thickness region at the center 45. In the compression region 42, the thickness is slightly larger than at the center 45, As can be seen, the deviations to standard thickness are comparatively small.

Figure 14:
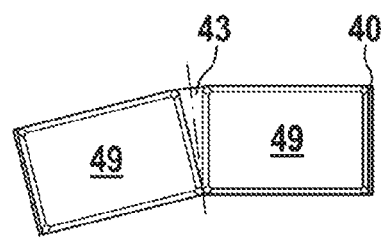
FIG. 14 shows two balancing weights of prior art mounted under an angle.

FIG. 14 shows two balancing weights 49 known from related art, that are mounted at an angle adapted to the radius of a rim as shown in FIG. 10. Here, the adhesive tape is extremely extended or stretched in a region 43 oriented outwards to the radius.

Figure 15:
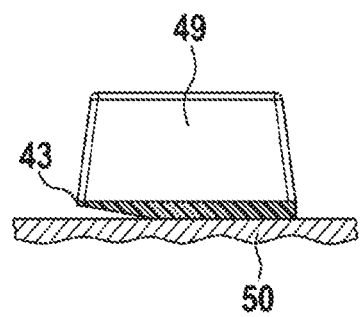
FIG. 15 shows a sectional view of the adhesive tape of FIG. 14.

FIG. 15 shows a sectional view through the adhesive tape between the balancing weights 49 of FIG. 14, which has a significantly lower thickness in the extreme stretching region 43 as compared to the normal thickness region. As can be seen, the deviations from the standard thickness are comparatively large, which may lead to a loss of adhesion in the extreme stretching region 43 of the arrangement of related art. Furthermore, with time debris may penetrate between the rim and the tape, which may lead to a loss of the weight.

It will be appreciated to those skilled in the art having the benefit of this disclosure that this invention is believed to provide balancing weights for vehicle wheels. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A self-adhesive balancing weight for balancing a wheel of a vehicle, the weight comprising:
    a bottom surface configured to be attached to a rim of the wheel, and a top surface opposing the bottom surface,
    two first sides opposing each other, and extending between the top surface and the bottom surface,
    two second sides opposing each other, and extending between the first sides and between the top surface and the bottom surface,
    wherein
    the first sides are longer than the second sides,
    the balancing weight is an arch segment having said bottom surface extending between the second sides, said bottom surface being convex,
    wherein the second sides forming an angle of less than 90° with respect the bottom surface, and an angle of more than 90° with respect the top surface, and
    wherein the second sides are convex-shaped from one first side to the other first side.

2. The balancing weight according to claim 1, wherein the first sides form an angle of less than 90° with respect to the bottom surface and an angle of more than 90° with respect to the top surface.

3. The balancing weight according to claim 1, wherein the bottom surface is convex shaped having a double-curvature extending between the second sides and the first sides.

4. A self-adhesive balancing weight for balancing a wheel of a vehicle, the weight comprising:
    a bottom surface configured to be attached to a rim of the wheel, and a top surface opposing the bottom surface,
    two first sides opposing each other, and extending between the top surface and the bottom surface,
    two second sides opposing each other, and between the first sides and arranged between the top surface and the bottom surface,
    wherein
    the first sides are longer than the second sides,
    the bottom surface is convex shaped and has a double-curvature extending between the second sides and the first sides.

5. The balancing weight according to claim 4, wherein the second sides form an angle of less than 90° with respect to the bottom surface, and an angle of more than 90° with respect to the top surface, and
    the second sides are convex-shaped from one first side to the other first side.

6. The balancing weight according to claim 4, wherein the first sides are at an angle of less than 90° with respect to the bottom surface and at an angle of more than 90° with respect to the top surface.

7. The balancing weight according to claim 1, wherein an adhesive tape is at the bottom surface of the balancing weight.

8. The balancing weight according to claim 4, wherein an adhesive tape is at the bottom surface of the balancing weight.

9. A chain of self-adhesive balancing weights comprising a plurality of balancing weights according to claim 1, the balancing weights being attached to an adhesive tape.

10. A chain of self-adhesive balancing weights comprising a plurality of balancing weights according to claim 4, the balancing weights being attached to an adhesive tape.

\* \* \* \* \*